US011422869B2

(12) United States Patent
Emerick et al.

(10) Patent No.: US 11,422,869 B2
(45) Date of Patent: Aug. 23, 2022

(54) PRESENTING COLLABORATION ACTIVITY

(71) Applicant: Box, Inc., Redwood City, CA (US)

(72) Inventors: Brian James Emerick, Mountain View, CA (US); Naeim Semsarilar, San Carlos, CA (US); Matthew Andrew Nguyen, Redwood City, CA (US); Swaroop Butala, Fremont, CA (US); Kevin Tsoi, San Francisco, CA (US); Zachary Kelly, Redwood City, CA (US)

(73) Assignee: Box, Inc.

( * ) Notice: Subject to any disclaimer, the term of this patent is extended or adjusted under 35 U.S.C. 154(b) by 0 days.

(21) Appl. No.: 16/017,838

(22) Filed: Jun. 25, 2018

(65) Prior Publication Data
US 2019/0391861 A1 Dec. 26, 2019

(51) Int. Cl.
*G06F 9/54* (2006.01)
*G06Q 10/10* (2012.01)
(Continued)

(52) U.S. Cl.
CPC ............ *G06F 9/542* (2013.01); *G06F 3/0483* (2013.01); *G06F 16/2477* (2019.01);
(Continued)

(58) Field of Classification Search
CPC ... G06F 9/46; G06F 9/54; G06F 9/542; G06F 16/00; G06F 16/20; G06F 16/24;
(Continued)

(56) References Cited

U.S. PATENT DOCUMENTS

| 2005/0182773 | A1* | 8/2005 | Feinsmith | G06Q 30/06 |
| 2006/0085245 | A1* | 4/2006 | Takatsuka | G06Q 10/10 |
| | | | | 705/7.12 |

(Continued)

FOREIGN PATENT DOCUMENTS

WO  WO-0197542 A1 * 12/2001 ............ H04W 76/40

OTHER PUBLICATIONS

Suthers, "Collaborative Knowledge Construction through Shared Representations", Proceedings of the 38th Hawaii International Conference on System Sciences—2005, pp. 1-10. (Year: 2005).*

(Continued)

*Primary Examiner* — Reza Nabi
*Assistant Examiner* — Hwei-Min Lu
(74) *Attorney, Agent, or Firm* — Vista IP Law Group, LLP

(57) ABSTRACT

Systems and methods for presenting collaboration activity to a particular user are disclosed. A method embodiment commences by recording event records that codify one or more event attributes corresponding to one or more content object access events. The content object access events are associated with two or more users that interact with the content objects. At a later moment in time, a subset of event records is selected, the selection being based at least in part on timestamps of the content object access events. A display order to apply to the selected subset of event records is determined, the order being based at least in part on timestamps of collaboration events arising from the users. Event messages to present in a user interface are generated, and the event messages are then displayed in the user interface in accordance with the display order.

21 Claims, 12 Drawing Sheets

(51) Int. Cl.
  *H04L 67/50* (2022.01)
  *G06F 3/0483* (2013.01)
  *G06F 16/901* (2019.01)
  *G06F 16/2458* (2019.01)
  *G06F 16/28* (2019.01)

(52) U.S. Cl.
  CPC ....... *G06F 16/9024* (2019.01); *G06Q 10/101* (2013.01); *H04L 67/22* (2013.01); *G06F 16/284* (2019.01)

(58) Field of Classification Search
  CPC ............... G06F 16/245; G06F 16/2455; G06F 16/2458; G06F 16/2477; G06F 16/284; G06F 16/9024; G06F 3/0483; G06Q 10/101; G06Q 10/103; H04L 67/22
  USPC .................................................. 715/751–759
  See application file for complete search history.

(56) References Cited

U.S. PATENT DOCUMENTS

| | | | | |
|---|---|---|---|---|
| 2008/0177617 A1* | 7/2008 | Gupta | .............. | G06Q 10/06375 705/7.29 |
| 2008/0263003 A1* | 10/2008 | Imielinski | ................ | G06F 16/18 |
| 2013/0297689 A1* | 11/2013 | Bhat | ........................ | H04L 51/32 709/204 |
| 2014/0025767 A1* | 1/2014 | De Kezel | ............. | G06Q 10/107 709/206 |
| 2014/0082503 A1* | 3/2014 | Tan | ........................ | H04W 4/60 715/736 |
| 2014/0222916 A1* | 8/2014 | Foley | ..................... | H04N 7/147 709/204 |
| 2014/0310132 A1* | 10/2014 | Culver | ................. | G06Q 10/101 705/26.81 |
| 2015/0100503 A1* | 4/2015 | Lobo | ..................... | G06Q 10/103 705/301 |
| 2015/0112749 A1* | 4/2015 | Erdal | ................. | G06Q 10/1095 715/752 |
| 2015/0127628 A1* | 5/2015 | Rathod | .................... | H04W 4/21 707/710 |
| 2016/0337213 A1* | 11/2016 | Deutsch | ................. | H04L 43/045 |
| 2016/0371352 A1* | 12/2016 | Kohlmeier | .............. | G06F 16/93 |
| 2017/0185592 A1* | 6/2017 | Frei | .......................... | G06F 16/41 |
| 2017/0371881 A1* | 12/2017 | Reynolds | ................. | G06F 16/21 |
| 2018/0115603 A1* | 4/2018 | Hu | ......................... | G06Q 50/01 |
| 2018/0284959 A1* | 10/2018 | Alphin, III | .............. | H04L 67/24 |
| 2019/0034491 A1* | 1/2019 | Griffith | ................. | G06F 16/256 |
| 2019/0124169 A1* | 4/2019 | Sundin | ................. | G06Q 10/101 |

OTHER PUBLICATIONS

Liu et al., "Network-Based Visual Analysis of Tabular Data", IEEE Symposium on Visual Analytics Science and Technology Oct. 23-28, 2011, pp. 41-50. (Year: 2011).*
Berger, Jonathan. "Introducing A New Box Notes for Web and Desktop | Box Blog". Blog.Box.Com, Jan. 24, 2017, https://blog.box.com/blog/new-box-notes-web-desktop/. Accessed Jul. 9, 2018.
Yeh, Chris. "Simplifying Collaboration Across Web and Mobile | Box Blog". Blog.Box.Com, Nov. 10, 2014, https://blog.box.com/blog/simplifying-collaboration-across-web-and-mobile/. Accessed Jul. 9, 2018.
U.S. Appl. No. 62/539,341, filed Jul. 31, 2017.
U.S. Appl. No. 62/539,367, filed Jul. 31, 2017.

* cited by examiner

PRESENTING COLLABORATION ACTIVITY

FIELD

This disclosure relates to collaboration systems, and more particularly to techniques for presenting collaboration activity.

BACKGROUND

Many user interfaces in modern computer applications often present information to improve the productivity of the user. For example, the user interface for an email application might include an event panel in a portion of the application workspace that presents a summary of email messages related to the user (e.g., received messages, sent messages, etc.). Such a listing of messages can be sorted and displayed chronologically by date and time, or alphabetically by sender, or alphabetically by subject. Furthermore, such a listing of messages can be filtered such that only messages that have certain attributes are displayed. For example, email messages sent to the user might be displayed in an instance of the user interface panel labeled "Inbox" that shows only received messages, while messages sent from the user might be displayed in an instance of the user interface panel labeled "Sent" that shows only sent messages. While such arrangements of messages can be useful, only messages directly pertaining to the user and/or the specific functionality of the application (e.g., sending and receiving email messages) are presented.

In many settings, user productivity can be further enhanced by knowledge of the activity of others. Specifically, users that constitute working groups (e.g., a product development team) might collaborate over various documents. In such a case, a particular user may benefit from knowing the activities of other group members as they pertain to the documents. Approaches that merely collect and present actual activities pertaining to one particular user are deficient in offering the user an accurate assessment of happenings in the working group. What is needed is an improved way of presenting pertinent and timely information to a user.

SUMMARY

The present disclosure describes techniques used in systems, methods, and in computer program products for presenting collaboration activity, which techniques advance the relevant technologies to address technological issues with legacy approaches. More specifically, the present disclosure describes techniques used in systems, methods, and in computer program products for time-based presentation of collaboration events. Certain embodiments are directed to technological solutions for establishing a framework to collect, sort and present various collaboration events that occur over multiple degrees of separation between users.

The disclosed embodiments modify and improve over legacy approaches. In particular, the herein-disclosed techniques provide technical solutions that address the technical problems attendant to presenting time-sensitive events to users belonging to multiple collaboration groups. Such technical solutions relate to improvements in computer functionality. Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of human-machine interfaces as well as advances in various technical fields related to collaboration systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
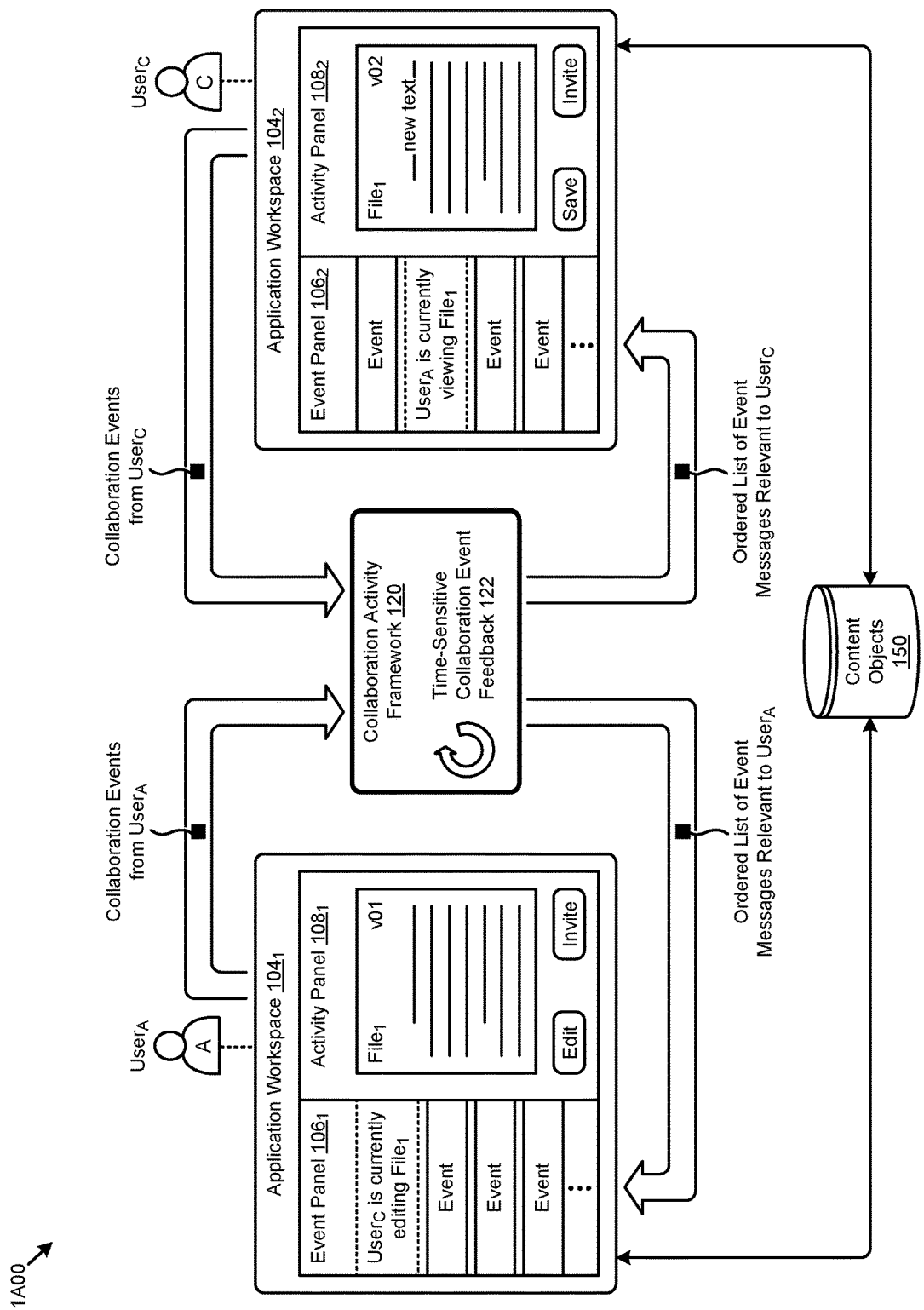
FIG. 1A illustrates a collaboration environment in which embodiments of the present disclosure can be implemented.

Embodiments in accordance with the present disclosure address the problem of presenting time-sensitive events to users belonging to multiple collaboration groups. Some embodiments are directed to approaches for establishing a framework to collect, sort and present various collaboration events that occur over multiple degrees of separation between users. The accompanying figures and discussions herein present example environments, systems, methods, and computer program products for time-based presentation of collaboration events.

Overview

In many working group settings, user productivity can be enhanced to include knowledge of the activities of others. Specifically, users that constitute working groups (e.g., a product development team) might collaborate over various documents. In such a case, a particular user may benefit from knowing the activities of other group members as they pertain to the documents. For example, if a working group that is collaborating over document D is composed of users Alice, Bob and Charlie, and Alice makes an editing change to document D, then a message indicating the change by Alice is sent to the event panels of the other collaborators, namely Bob and Charlie. By observing such messages, Bob and Charlie can know that there has been some collaboration activity (e.g., by Alice) on document D. Bob and Charlie can then take action (e.g., view the changes) based at least in part on the presented messages.

As the occurrence of working groups that any particular user is involved in, and/or, as the number of members of the working groups continue to grow in number, user visibility into ongoing actions by other members becomes more and more important. Disclosed herein are techniques for establishing a framework to collect, sort and present various collaboration events that occur as a result of actions taken by the members of the working groups.

In certain embodiments, a user that is part of a collaboration group accesses a user interface that comprises an event panel for presenting the sorted collaboration events. In example embodiments, various collaboration events are recorded in an event graph data structure, which specialized data structure changes over time as events over groups of users (e.g., collaboration group constituency) and/or events over documents worked on by users (e.g., document previews, document edit changes, etc.) are processed. Events over documents worked on by users might include content object access events (e.g., viewing or editing of a document). Events over groups might include user interaction events (e.g., inviting a user to collaborate), and/or changes in user status (e.g., assignment of a user to collaboration group leader status), and/or other events.

On an ongoing basis, the event graph data structure is queried to identify collaboration events relevant to the user. Such events might have been raised by activities throughout various degrees of separation between multiple users and/or between users and collaboration objects rather than merely events that are directly associated with a particular user. The selected collaboration events are then sorted to determine a display order. A set of event messages that correspond to the sorted collaboration events are displayed in the event panel of the user interface in accordance with the sorted order. In certain embodiments, certain styling and/or visual screen devices (e.g., coloring, animated widgets, etc.) are applied to the event messages in accordance with certain attributes of the events. For example, certain styling and/or visual screen devices might indicate that the event requires immediate action by the user. Or, certain styling and/or visual screen elements might indicate that a content object associated with the event has not been viewed by the user, or that a content object associated with the event is currently being edited by another user. Combinations of the aforementioned sorting and styling and visual elements are used in conjunction with the event panel to indicate time-based relevance to the user.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a collaboration environment 1A00 in which embodiments of the present disclosure can be implemented. As an option, one or more variations of collaboration environment 1A00 or any aspect thereof may be implemented in the context of the architecture and functionality of the embodiments described herein. The collaboration environment 1A00 or any aspect thereof may be implemented in any environment.

FIG. 1A illustrates one aspect pertaining to establishing a framework to collect, sort and present, to a user, various collaboration events that occur over multiple degrees of separation from the user. Specifically, the figure is presented to illustrate how such a framework can provide time-sensitive collaboration event information to the user and/or other users associated with the user.

Specifically, FIG. 1A illustrates a selected set of users (e.g., User$_A$ and User$_C$) from a plurality of users that each interact with a computing system (e.g., cloud-based content management system) through an application workspace (e.g., application workspace $104_1$ and application workspace $104_2$). The application workspace can be user interfaces that correspond to a specific application, such as an application to facilitate collaboration over a set of content objects 150. As such, the application workspaces have activity panels (e.g., activity panel $108_1$ and activity panel $108_2$) where the users can create, edit, view, and/or otherwise manage the content objects 150.

In such settings, user productivity can be enhanced by knowledge of the activity of other users. For example, $User_A$ may benefit from knowing the activities of $User_C$ as pertains to certain documents (e.g., a file named $File_1$). While FIG. 1A merely shows two representative users, collaboration groups comprising users such as $User_A$ and $User_C$ can have many members. As the constituents of collaboration groups continue to grow in number, challenges to presenting pertinent and timely activity messaging to such constituents also grows commensurately.

The herein disclosed techniques address such challenges by establishing a collaboration activity framework 120 to collect, sort and present various collaboration events that are relevant to each particular user. As shown, the collaboration activity framework 120 consumes the collaboration events associated with $User_A$, the collaboration events associate with $User_C$, and/or any other collaboration events that might be pertinent to $User_A$ or $User_C$ (e.g., all collaboration events for an enterprise), and presents an ordered list of event messages that are relevant to $User_A$, and an ordered list of event messages that are relevant to $User_C$. The user-specific event messages are presented in an event panel (e.g., event panel $106_1$ and event panel $106_2$) of each user's application workspace. By continually collecting, sorting and presenting relevant collaboration events to the applicable users, the collaboration activity framework delivers a time-sensitive collaboration event feedback 122 to the constituents of particular collaboration groups.

In the example illustrated in FIG. 1A, at some moment in time $User_A$ might be viewing version "v01" of $File_1$. The collaboration activity framework 120 will present a message to $User_C$ indicating that "$User_A$ is currently viewing $File_1$". At the same moment in time, $User_C$ might be editing $File_1$. For example, $User_C$ may be in the process of typing "new text" into $File_1$. Since the file has been changed from version "v01", a new version "v02" of $File_1$ has been created. As facilitated by the collaboration activity framework 120, $User_A$ will also receive a message indicating that "$User_C$ is currently editing $File_1$". In some cases, the changes entered by $User_C$ in activity panel $108_2$ may be displayed in activity panel $108_1$ of $User_A$.

While the example of FIG. 1A describes time-sensitive feedback of collaboration events pertaining to content object access, other types of collaboration events can be processed and presented by the herein disclosed techniques as disclosed in detail as follows.

Figure 1B:
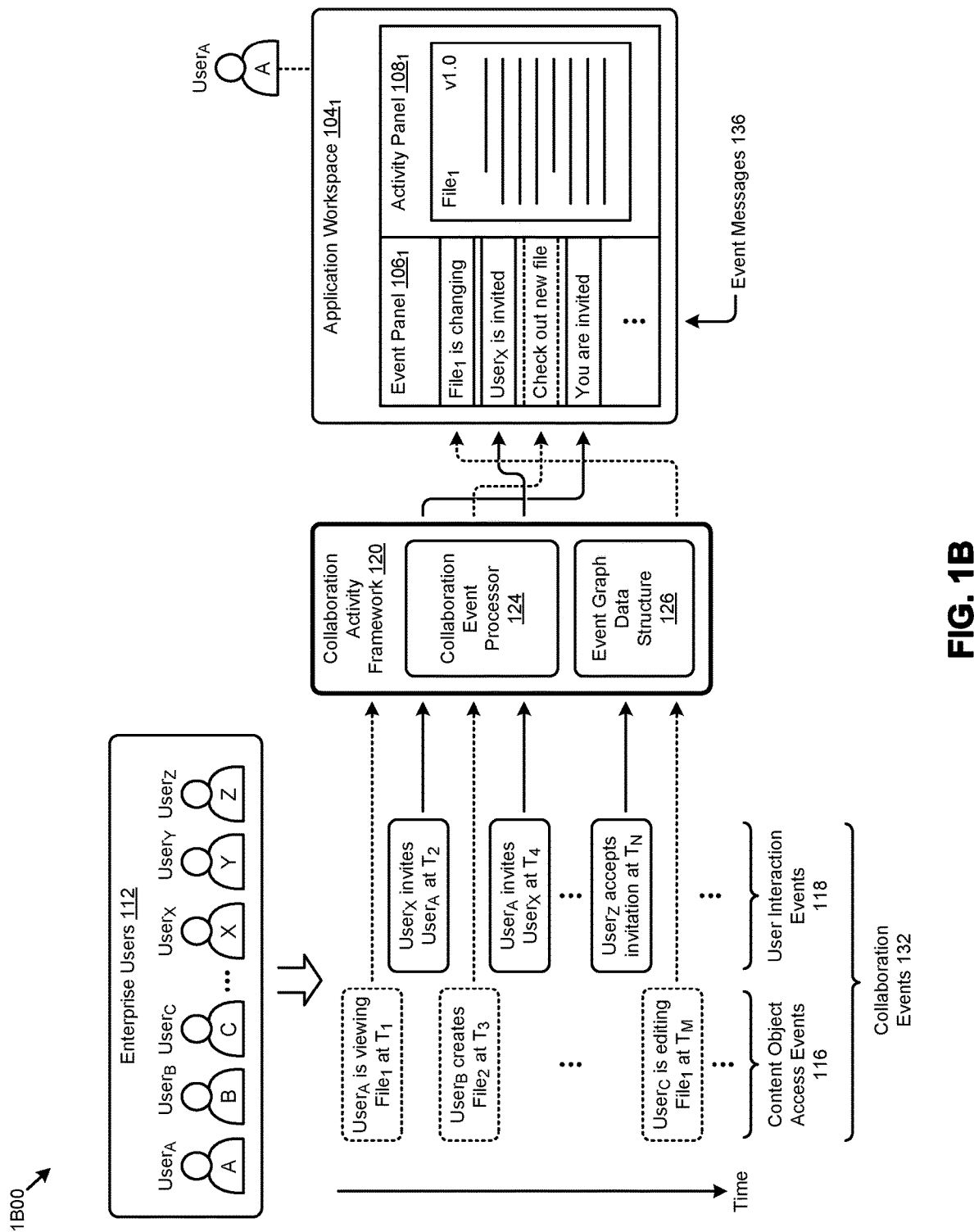
FIG. 1B illustrates a computing environment in which embodiments of the present disclosure can be implemented.

FIG. 1B illustrates a computing environment 1B00 in which embodiments of the present disclosure can be implemented. As an option, one or more variations of computing environment 1B00 or any aspect thereof may be implemented in the context of the architecture and functionality of the embodiments described herein. The computing environment 1B00 or any aspect thereof may be implemented in any environment.

FIG. 1B illustrates one aspect pertaining to establishing a framework to collect, sort and present various collaboration events that occur over multiple degrees of separation from the user. Specifically, the figure is being presented with respect to its contribution to addressing the problem of presenting time-sensitive events to users belonging to multiple collaboration groups.

FIG. 1B illustrates one aspect pertaining to establishing a framework to collect, sort and present, to a user, various collaboration events that occur over multiple degrees of separation from the user. Specifically, the figure is presented to illustrate how such a framework can provide event messages to the user that pertain to content object access events, user interaction events, and/or other types of collaboration events associated with the user.

Specifically, FIG. 1B depicts the application workspace $104_1$ of $User_A$ as earlier described as pertains to FIG. 1A. As shown, $User_A$ can interact with an activity panel $108_1$ and an event panel $106_1$ in application workspace $104_1$. For example, $User_A$ might manage (e.g., create, edit, view, etc.) content objects (e.g., file $File_1$) in activity panel $108_1$. $User_A$ might further interact with (e.g., observe, click, etc.) a set of event messages 136 in event panel $106_1$ that are presented in event panel $106_1$ in accordance with the herein disclosed techniques.

As can be observed, the event messages 136 are derived from various instances of collaboration events 132 associated with a set of enterprise users 112 (e.g., $User_A$, $User_B$, $User_C$, ..., $User_X$, $User_Y$, $User_Z$). The collaboration events 132 occur over time and are characterized by a relationship between objects. Specifically, and as shown, collaboration events can comprise content object access events 116 that are events pertaining to a correspondence between a "user" object and a "content" object (e.g., "$User_A$ is viewing $File_1$ at $T_1$"). Collaboration events can also comprise user interaction events 118 that are events pertaining to one or more relationships between a first user and a second user, which relationships arise either due to an action taken over a collaboration object by the first or second user, or due to an explicit codification of a record that "collabs-in" a particular user to a collaboration group. In addition to capturing the relationship aspect pertaining to a type of user-to-user interaction event (e.g., when a particular user is "collabed-in" to a collaboration group by another user), any one or more of the user interaction events 118 can also comprise a time such as a time when a user created one or more content objects (e.g., files or folders) to be the subject of one or more invitations to collaborate over the one or more newly-created content objects. As such, an invitation to collaborate corresponds to a record that "collabs-in" a particular user into a collaboration group, which group includes access privileges for the particular user to access stored content objects.

The occurrence of the new relationship resulting from being newly "collabed-in" can be delivered to a particular user in the form of an invitation message. An invitation message can be formed by an invitation to collaborate string (e.g., "$User_A$ invites $User_X$ at $T_4$", or "$User_A$ invites $User_X$ to access $Folder_Z$ at $T_4$") which can in turn be presented as an invitation to collaborate message in event panel $106_1$. In this and other embodiments, some of the collaboration events 132 arise from creation of an object by a user other than the particular user who is viewing the event panel $106_1$. Other types of collaboration events 132 are possible.

According to the herein disclosed techniques, the collaboration events 132 are consumed by the collaboration activity framework 120 to produce the event messages 136 for $User_A$, and/or other user-specific sets of event messages for other users from the enterprise users 112. Specifically, a collaboration event processor 124 can collect, sort and generate the event messages 136 to be presented in event panel $106_1$. An event graph data structure 126 is used to organize the collaboration events 132. More specifically, the event graph data structure 126 records the event attributes of the collaboration events 132 in a manner that facilitates identification of the objects, relationship or relationships, and/or other attributes (e.g., timestamps, etc.) of the collaboration events 132. By querying the event graph data structure 126, the collaboration event processor 124 can select the user-specific collaboration events that are relevant for presentation as event messages to a particular user.

One embodiment of techniques for such presentation of user-specific event messages as facilitated by the techniques described herein is disclosed in further detail as follows.

Figure 2:
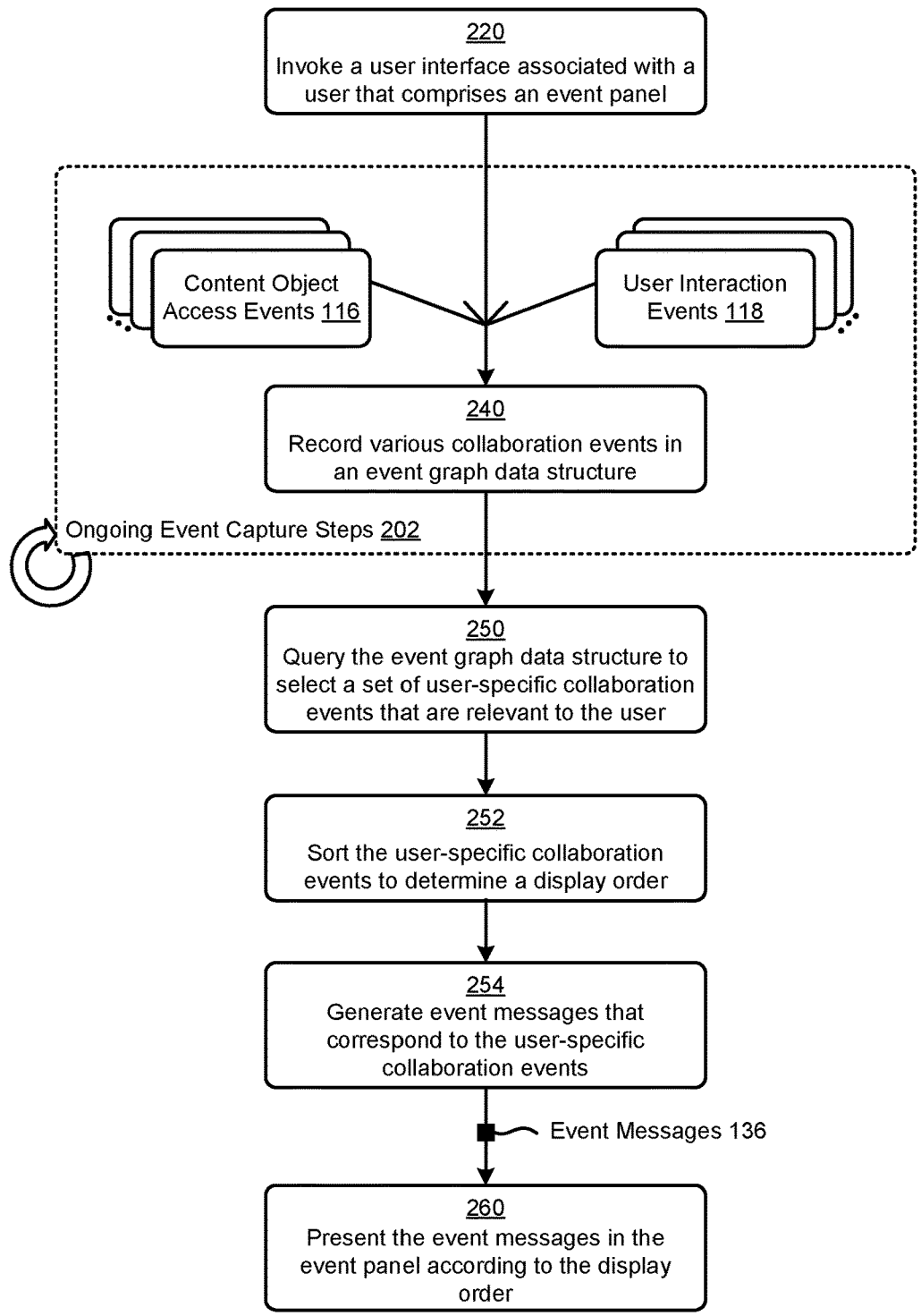
FIG. 2 depicts a collaboration event presentation technique as implemented in systems that facilitate time-based presentation of collaboration events, according to an embodiment.

FIG. 2 depicts a collaboration event presentation technique 200 as implemented in systems that facilitate time-based presentation of collaboration events. As an option, one or more variations of collaboration event presentation technique 200 or any aspect thereof may be implemented in the context of the architecture and functionality of the embodiments described herein. The collaboration event presentation technique 200 or any aspect thereof may be implemented in any environment.

The collaboration event presentation technique 200 presents one embodiment of certain steps and/or operations that facilitate establishing a framework to collect, sort and present various collaboration events that occur over multiple degrees of separation from the user. The collaboration event presentation technique 200 can commence by invoking a user interface associated with a user that comprises an event panel (step 220). For example, the event panel might be a portion of a view rendered in a web browser. Various collaboration events are recorded in an event graph data structure (step 240). As can be observed, such collaboration events can comprise content object access events 116, user interaction events 118, and/or other types of collaboration events (e.g., user preference change events, user profile change events, etc.). The ongoing event capture steps 202 serve to capture content object access events 116, user interaction events 118, and/or other types of collaboration events and record them into an event graph. These ongoing event capture steps 202 can be processed on an ongoing basis regardless of the state of interaction that any particular user has with the user interface.

The event graph data structure, for example, is a data structure that stores and/or organizes the event attributes of the recorded events so as to facilitate a logical graph representation (e.g., with "nodes" and "edges" between the nodes) of the events. The event graph data structure is queried to select a set of user-specific collaboration events from the collaboration events that are relevant to the user (step 250). The user-specific collaboration events are then sorted to determine a display order (step 252). As an example, the user-specific collaboration events might be sorted according to the time of occurrence of each event. In some cases, the display order would arrange the user-specific collaboration events in order from newest to oldest. Event messages that correspond to the user-specific collaboration events are generated (step 254) and presented in the event panel of the particular user in accordance with the display order (step 260). The presentation depends, at least in part, on the display order that was generated in step 252. More specifically, the display order depends on the time-ordered juxtaposition of event messages that depend from occurrences of content object access events that are displayed together (e.g., in the same event panel) with event messages that depend from occurrences of user interaction events. Depending on the specific timing of display to and/or interaction with a user, it can happen that the display screen shows only event messages that depend from occurrences of content object access events or, depending on the timing of the display to a user, it can happen that the display screen shows only event messages that depend from occurrences of user interaction events. In some cases, depending on the specific timing of display, it can happen that only collaboration events that arise from the creation of an object (e.g., folder or file) by a user other than the particular user are displayed at that moment in time. In yet other cases, depending on the specific timing of display, it can happen that events that arise from invitations related to creation of a content object (e.g., folder or file) by a user other than the particular user are comingled with other events in the display.

One embodiment of a system for implementing the collaboration event presentation technique 200 and/or other herein disclosed techniques is disclosed as follows.

Figure 3:
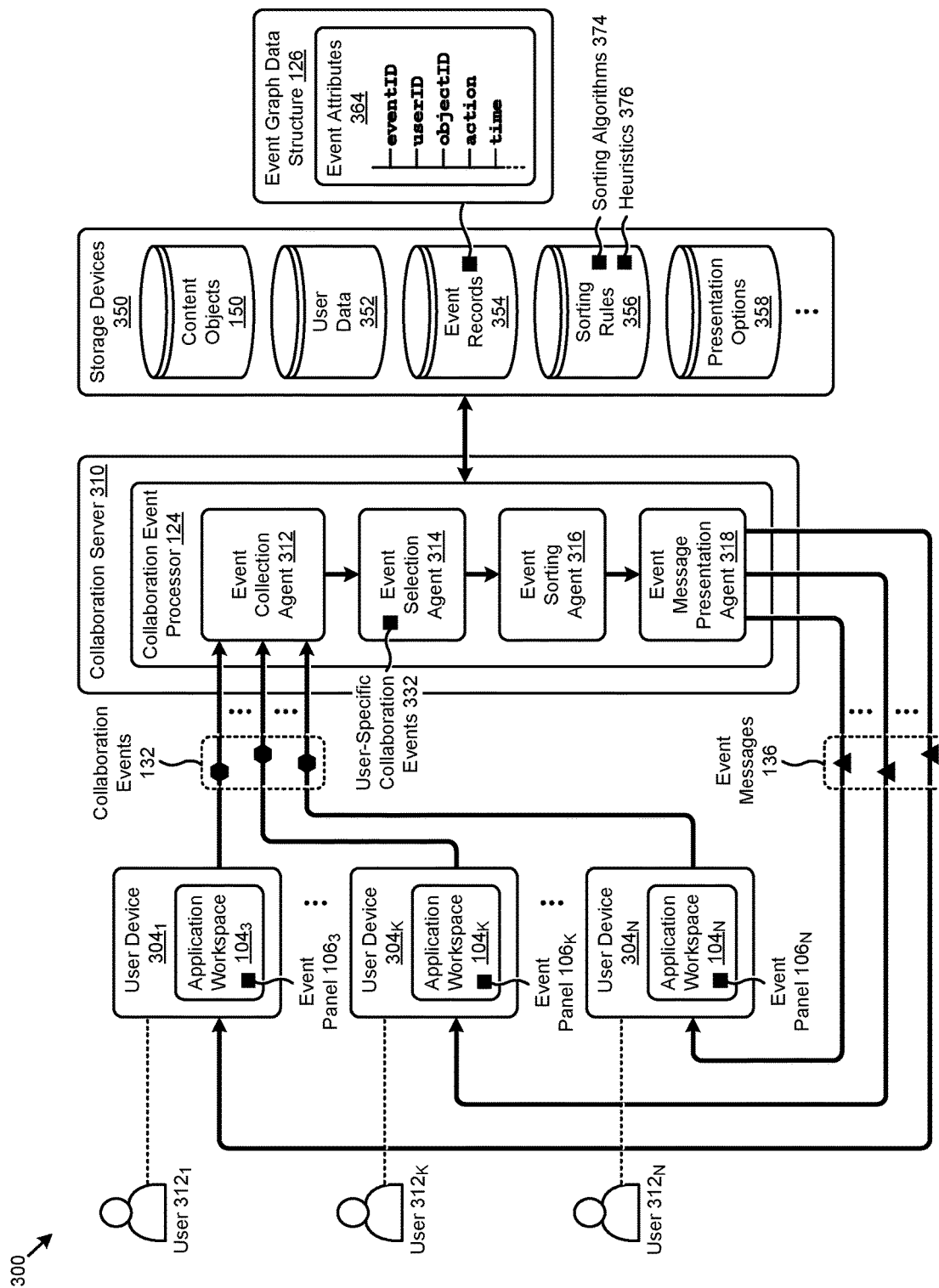
FIG. 3 depicts a computing system that is partitioned to implement time-based presentation of collaboration events, according to some embodiments.

FIG. 3 depicts a computing system 300 that is partitioned to implement time-based presentation of collaboration events. As an option, one or more variations of computing system 300 or any aspect thereof may be implemented in the context of the architecture and functionality of the embodiments described herein. The computing system 300 or any aspect thereof may be implemented in any environment.

FIG. 3 illustrates one aspect pertaining to establishing, by an on-premise computing system, a reverse connection resource with a remote computing system that facilitates data restoration operations invoked from the remote computing system. Specifically, the figure is being presented to show one embodiment of the components and associated data flows that facilitate presenting time-sensitive events to users belonging to multiple collaboration groups. The components and data flows shown in FIG. 3 present one partitioning and associated data manipulation approach. The specific example shown is purely exemplary, and other subsystems, data structures, and/or partitioning are reasonable.

Specifically, the computing system 300 comprises an instance of the collaboration event processor 124 operating at an instance of a collaboration server 310. A plurality of instances of the collaboration event processor 124 might operate at a plurality of instances of the collaboration server 310 in a particular computing system. Such instances can access a set of storage devices 350 that store various information that facilitates operation of the computing system 300 and/or implementation therein of the herein disclosed techniques. For example, the collaboration server 310 might facilitate content access to shared content in content objects 150 by a plurality of users (e.g., user $312_1$, . . . , user $312_K$, . . . , user $312_N$) from a respective set of user devices (e.g., user device $304_1$, . . . , user device $304_K$, . . . , user device $304_N$).

In some cases, the users can interact with user interfaces or application workspaces (e.g., application workspace $104_3$, . . . , application workspace $104_K$, . . . , application workspace $104_N$) at the user devices to invoke certain collaboration events 132 at the computing system 300. According to the herein disclosed techniques, instances of event messages 136 derived from user-specific collaboration events selected from the collaboration events 132 are presented to the users at a respective set of event panels (e.g., event panel $106_3$, . . . , event panel $106_K$, . . . , event panel $106_N$).

More specifically, an event collection agent 312 at the collaboration event processor 124 can detect the collaboration events 132 invoked by the plurality of users. The event collection agent 312 can codify certain event attributes pertaining to the collaboration events 132 in a set of event records 354 stored in the storage devices 350. In some cases, event collection agent 312 will access a set of user attributes (e.g., user identifiers, etc.) stored in user data 352 and/or a set of content object metadata (e.g., content object identifiers, etc.) stored in content objects 150 to facilitate populating the event records 354.

The event records 354 and/or any other data described herein can be organized and/or stored using various techniques. For example, the event records 354 might be organized and/or stored in a tabular structure (e.g., relational database table) that has rows that relate various objects, such as users or documents, that pertain to a particular collaboration event. As another example, the information might be organized and/or stored in a programming code object that has instances corresponding to a particular event and properties corresponding to the various attributes associated with the event. In some cases, any of the foregoing data structures might be logically represented in a graph that comprises nodes (e.g., event objects) and edges (e.g., pairwise relationships between the event objects). As depicted in FIG. 3, event records 354 is represented by an event graph data structure 126 that comprises instances of event attributes 364. In this case, an event data record (e.g., table row or object instance or graph relationship) for a particular event might describe an event identifier (e.g., stored in an "eventID" field), a user identifier (e.g., stored in a "userID" field), an object identifier (e.g., stored in an "objectID" field), an object action type description (e.g., stored in an "action" field), an event timestamp (e.g., stored in a "time" field), and/or other event attributes.

An event selection agent 314 at the collaboration event processor 124 can access the event records 354 to select one or more user-specific collaboration events 332 for a particular subject user. Such user-specific collaboration events can comprise events over various degrees of separation from the subject user, as discussed in further detail as pertains to FIG. 4. An event sorting agent 316 at the collaboration event processor 124 sorts the user-specific collaboration events 332 into a certain display order. In certain embodiments, the display order indicates the rank order of the user-specific collaboration events 332 in terms of some metric associated with the corresponding subject user. The display order is then used, for example, to determine the visual placement (e.g., the top of the event panel) of event messages that correspond to the user-specific collaboration events 332. As shown, the event sorting agent 316 might access a set of sorting algorithms 374 or heuristics 376 in the sorting rules 356 to determine the display order.

An event message presentation agent 318 at collaboration event processor 124 generates the event messages 136 that correspond to the user-specific collaboration events 332. For example, event message presentation agent 318 can compose an event message from the event attributes of a particular user-specific collaboration event that comprises a human-readable description of the event (e.g., "File$_1$ is currently being edited by User$_X$"). In some cases, event message presentation agent 318 might access a set of presentation options 358 to add visual elements (e.g., styling, icons, avatars, animated GIFs, etc.) to a particular event message. As an example, the event message in the aforementioned example might include an animated GIF to visually indicate that an ongoing activity (e.g., editing) is associated with that event. When the event messages 136 are prepared, event message presentation agent 318 facilitates delivery of the messages to the event panels of the user interfaces of respective users.

The foregoing discussions include techniques for recording collaboration events in an event graph data structure (e.g., step 240 of FIG. 2), which techniques are disclosed in further detail as follows.

Figure 4:
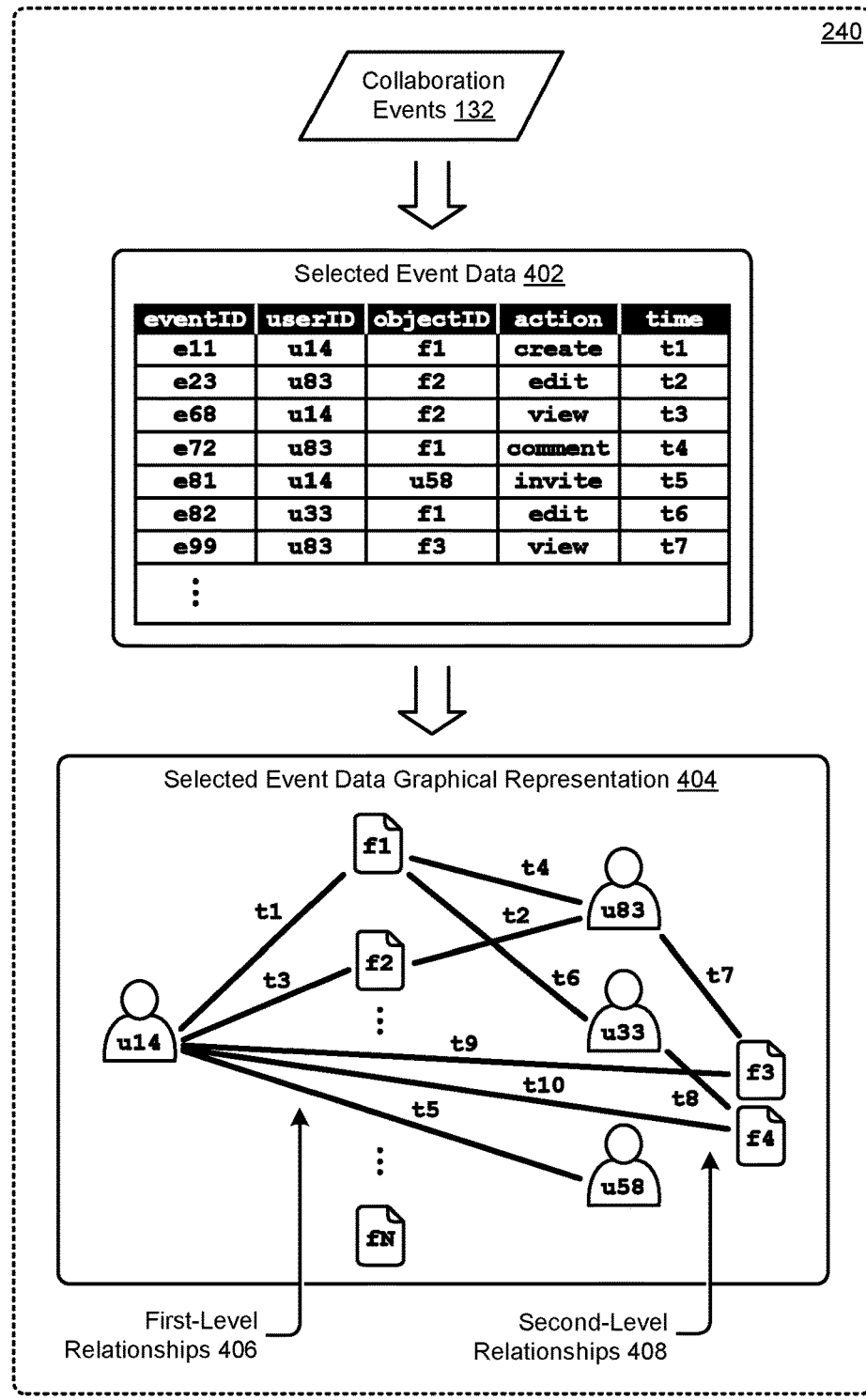
FIG. 4 presents an event attribute data structure as implemented in systems that facilitate time-based presentation of collaboration events, according to an embodiment.

FIG. 4 presents an event attribute data structure 400 as implemented in systems that facilitate time-based presentation of collaboration events. As an option, one or more variations of event attribute data structure 400 or any aspect thereof may be implemented in the context of the architecture and functionality of the embodiments described herein. The event attribute data structure 400 or any aspect thereof may be implemented in any environment.

FIG. 4 illustrates one aspect pertaining to establishing a framework to collect, sort and present various collaboration events that occur over multiple degrees of separation from the user. Specifically, the figure is presented to describe one embodiment of a specialized data structure for recording and accessing event attributes pertaining to the collaboration events. As shown, a set of selected event data 402 collected from various instances of collaboration events 132 can be organized in a tabular structure. The columns in the shown event data table correspond to the event attributes recorded for each collaboration event depicted in selected event data 402. For example, the selected event data indicates that a collaboration event identified as "e68" corresponds to a user "u14" viewing (e.g., "action=view") an object "f2" at time "t3". Another event "e81" corresponds to user "u14" inviting (e.g., "action=invite") a user "u58" (e.g., to join a collaboration group, to collaborate on a content object, etc.) at time "t5".

The selected event data 402 can be logically represented in a selected event data graphical representation 404 (e.g., an event graph data structure). As shown, the selected event data graphical representation 404 comprises nodes (e.g., points, vertices, etc.) that correspond to user objects (e.g., "u14", "u83", "u33", and "u58") or content objects (e.g., "f1", "f2", "f3", "f4" and "fN"). The edges (e.g., arcs, lines, etc.) between the nodes represent the pairwise relationships between the nodes (e.g., objects). Such object relationships can have certain characteristics and/or attributes associated with them. For example, and as indicated in the figure, the object relationships are associated with at least the "time" attribute (e.g., "t1", "t2", "t3", "t4", "t5", "t7", "t8", "t9" and "t10") to characterize the time of a collaboration event involving the user objects and content objects acted on as a result of the specific relationship.

The selected event data graphical representation 404 illustrates how user-specific collaboration events might be selected for a particular user. Specifically, with user "u14" as the subject user, the collaboration events directly involving user "u14" are represented by a set of first-level relationships 406. Collaboration events one more degree of separation from user "u14" are represented by a set of second-level relationships 408. In some cases, a time corresponding to an event pertaining to a particular relationship is associated with a graph edge. The example of FIG. 4 depicts times t1, t2, t3, t4, t5, and t6 on the edges of first-level relationships. Also, the example of FIG. 4 depicts times t7, t8, t9, and t10 on the edges of second-level relationships.

Additional relationship levels and/or degrees of separation may be considered when selecting user-specific collaboration events for a particular subject user.

Further details regarding general approaches to managing data structures pertaining to collaboration events are described in U.S. Application Ser. No. 62/539,341 titled "FORMING EVENT-BASED RECOMMENDATIONS", filed on Jul. 31, 2017, which is hereby incorporated by reference in its entirety.

Further details regarding general approaches to managing real-time user-to-user relationships are described in U.S. Application Ser. No. 62/539,367 titled "SPONTANEOUS NETWORKING", filed on Jul. 31, 2017, which is hereby incorporated by reference in its entirety.

The foregoing discussions include techniques for selecting user-specific collaboration events for a particular subject user (e.g., step 250 of FIG. 2), which techniques are disclosed in further detail as follows.

Figure 5A:
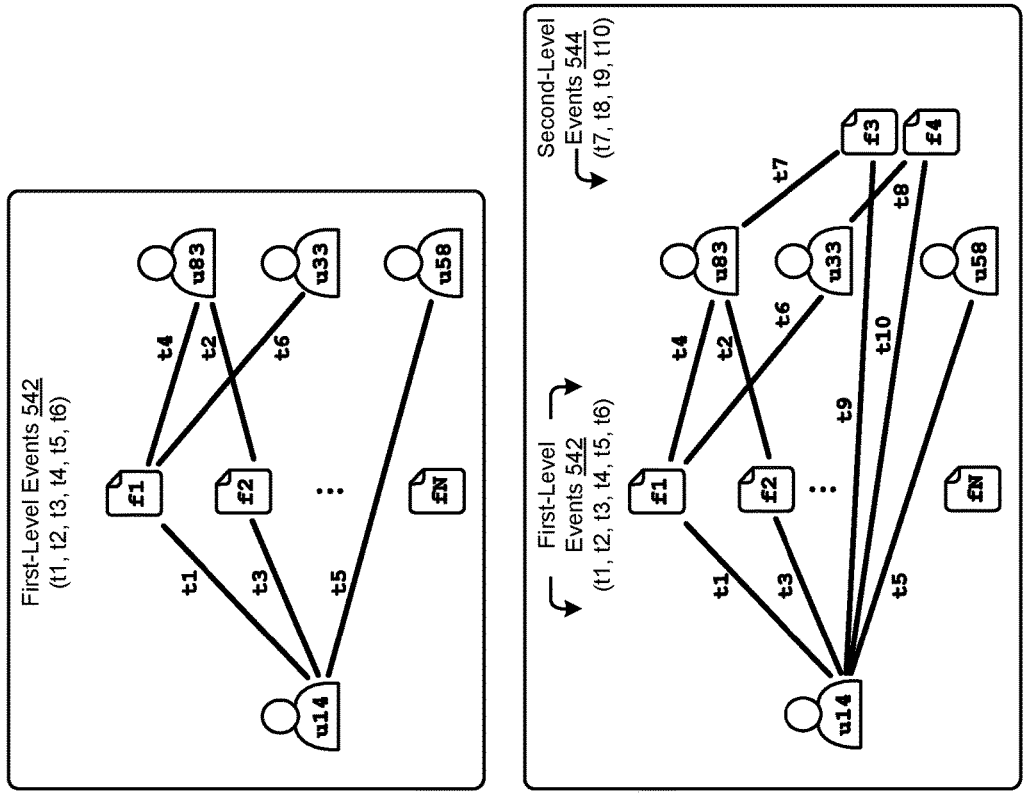
FIG. 5A depicts an event selection technique as implemented in systems that facilitate time-based presentation of collaboration events, according to an embodiment.
Figure 5A:
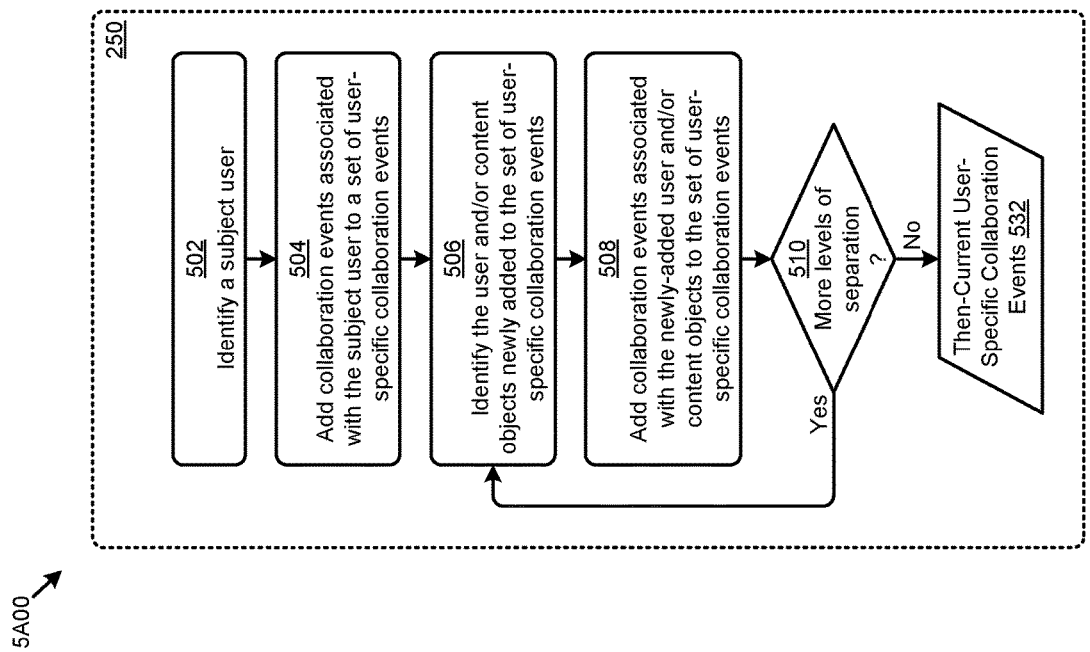

FIG. 5A depicts an event selection technique 5A00 as implemented in systems that facilitate time-based presentation of collaboration events. As an option, one or more variations of event selection technique 5A00 or any aspect thereof may be implemented in the context of the architecture and functionality of the embodiments described herein. The event selection technique 5A00 or any aspect thereof may be implemented in any environment.

FIG. 5A illustrates one aspect pertaining to establishing a framework to collect, sort and present various collaboration events that occur over multiple degrees of separation from the user. Specifically, the figure is presented to illustrate one embodiment of certain steps and/or operations for selecting user-specific collaboration events that are relevant to the user (e.g., step 250 of FIG. 2).

The event selection technique 5A00 shown in FIG. 5A can commence by identifying a subject user, such as a user identified as "u14" (step 502). Any collaboration events directly associated with the subject user (e.g., where the subject user is one of the event objects) are added to a set of user-specific collaboration events (step 504). For example, a set of first-level events 542 that are associated with timestamps "t1", "t3" "t5" might be added to the set of user-specific collaboration events since they directly involve user "u14". Furthermore, timestamps "t4" "t2" and "t6" might be added to the set of first-level events 542 events since they directly involve a content object that is associated with user "u14".

The user and/or content objects newly added to the set of user-specific collaboration events is determined (step 506). For example, the newly added user and/or content objects from the first-level events 542 includes "f1", "f2" and "fN". Events associated with the newly added user and/or content objects are added to the set of user-specific collaboration events (step 508). As shown by the set of second-level events 544, the events that are associated with timestamps "t7", "t8", "t9" and "t10" might be added to the set of user-specific collaboration events since they are associated with activities that are separated by one topological degree on the graph. If more degrees or levels of separation are desired (see "Yes" path of decision 510), any newly added objects (e.g., "u83", "u33" and "u58") and their activities are considered such that events associated with the objects at a next degree of separation are added to the set of user-specific collaboration events. The number of levels to consider can be fixed or controlled, for example, by a system administrator. When no more levels of separation are to be considered (see "No" path of decision 510), a set of then-current user-specific collaboration events 532 is established.

The foregoing discussions include techniques for sorting user-specific collaboration events to determine a display order (e.g., step 252 of FIG. 2), which techniques are disclosed in further detail as follows.

Figure 5B:
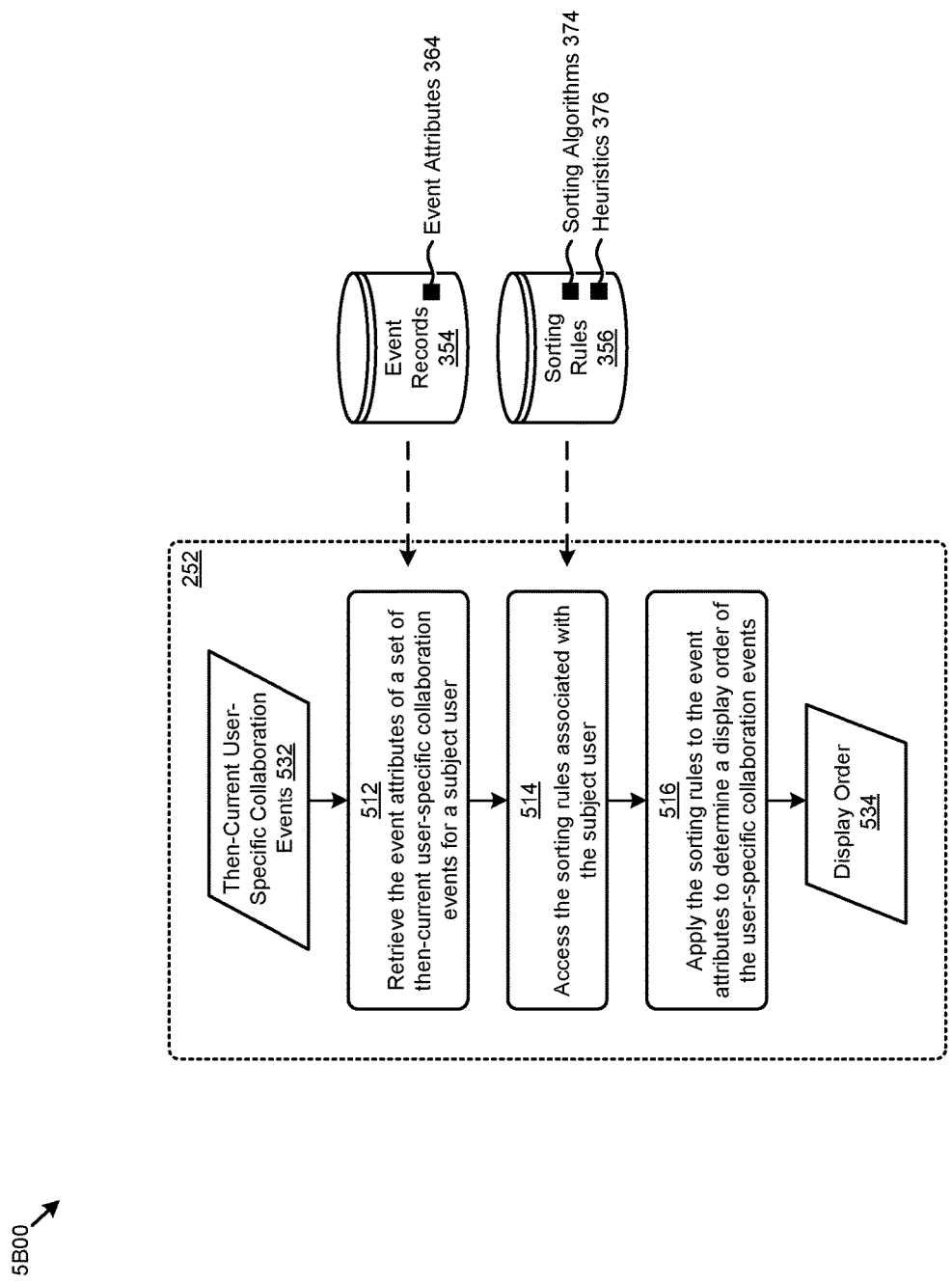
FIG. 5B depicts an event sorting technique as implemented in systems that facilitate time-based presentation of collaboration events, according to an embodiment.

FIG. 5B depicts an event sorting technique 5B00 as implemented in systems that facilitate time-based presentation of collaboration events. As an option, one or more variations of event sorting technique 5B00 or any aspect thereof may be implemented in the context of the architecture and functionality of the embodiments described herein. The event sorting technique 5B00 or any aspect thereof may be implemented in any environment.

FIG. 5B illustrates one aspect pertaining to establishing a framework to collect, sort and present various collaboration events that occur over multiple degrees of separation from the user. Specifically, the figure is presented to illustrate one embodiment of certain steps and/or operations for sorting user-specific collaboration events that have been selected for the user.

The event sorting technique 5B00 shown in FIG. 5B can commence by retrieving the event attributes of the then-current user-specific collaboration events for a subject user (step 512). For example, instances of event attributes 364 that correspond to the then-current user-specific collaboration events 532 might be retrieved from event records 354. A set of sorting rules associated with the subject user are accessed (step 514). As an example, the sorting algorithms 374 and/or heuristics 376 that pertain to the subject user might be accessed at the sorting rules 356 storage facility. The sorting rules are applied to the retrieved event attributes to determine a display order 534 for the user-specific collaboration events (step 516). As earlier mentioned, the display order might be determined based at least in part on the timestamps associated with the user-specific collaboration events.

The foregoing discussions include techniques for generating a plurality of event messages that correspond to user-specific collaboration events (e.g., step 254 of FIG. 2), which techniques are disclosed in further detail as follows.

Figure 5C:
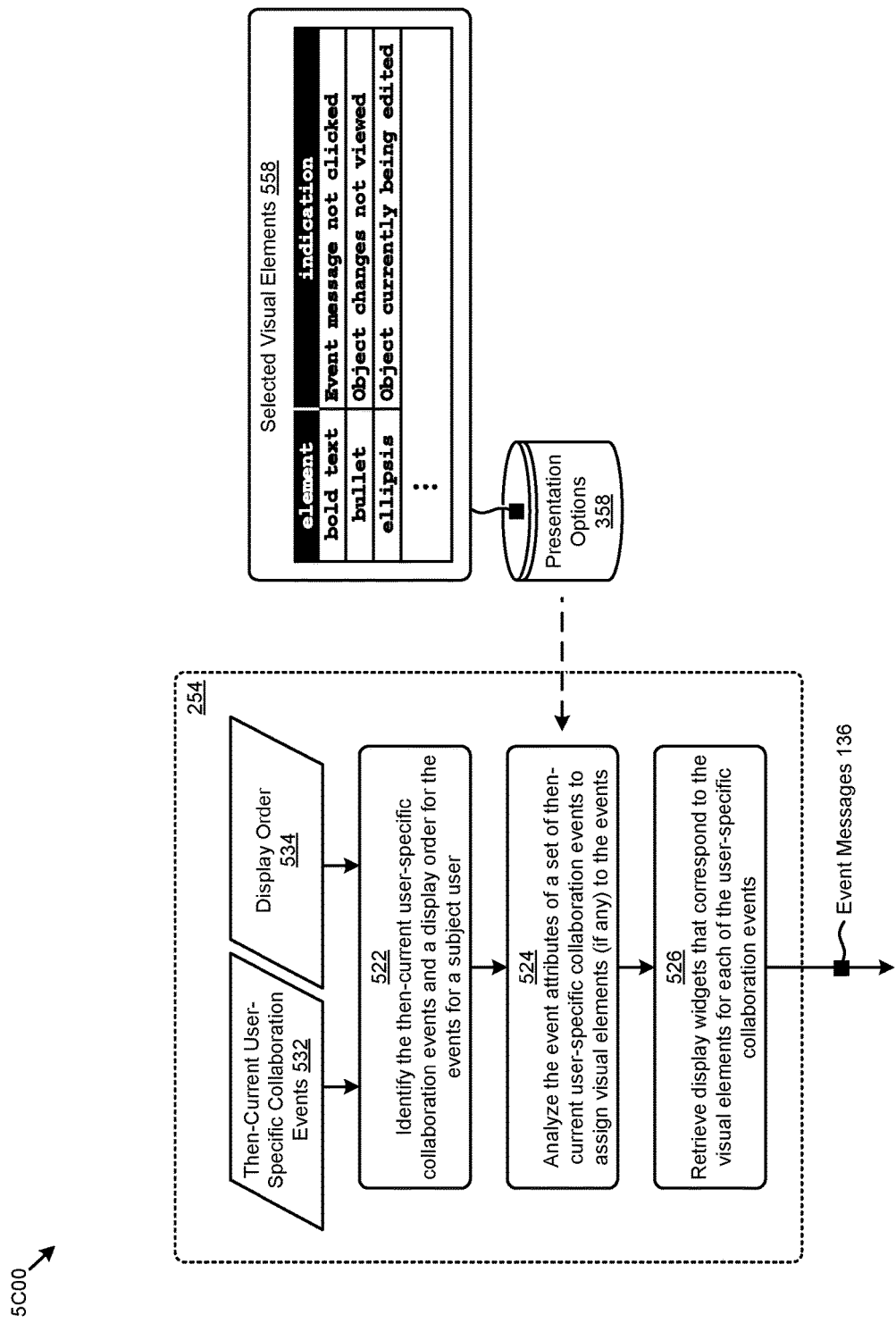
FIG. 5C depicts an event message generation technique as implemented in systems that facilitate time-based presentation of collaboration events, according to an embodiment.

FIG. 5C depicts an event message generation technique 5C00 as implemented in systems that facilitate time-based presentation of collaboration events. As an option, one or more variations of event message generation technique 5C00 or any aspect thereof may be implemented in the context of the architecture and functionality of the embodiments described herein. The event message generation technique 5C00 or any aspect thereof may be implemented in any environment.

FIG. 5C illustrates one aspect pertaining to establishing a framework to collect, sort and present various collaboration events that occur over multiple degrees of separation from the user. Specifically, the figure is presented to illustrate one embodiment of certain steps and/or operations for generating event messages to present to the user.

The event message generation technique 5C00 shown in FIG. 5C can commence by identifying a set of the then-current user-specific collaboration events (e.g., then-current user-specific collaboration events 532) and a corresponding display order (e.g., display order 534) for a subject user (step 522). The event attributes of the then-current user-specific collaboration events are analyzed to assign visual elements (if any) to the events (step 524). For example, the event attributes of the then-current user-specific collaboration events 532 might be analyzed to determine if any visual elements from presentation options 358 are to be assigned to the events. As shown in selected visual elements 558, such presentation options might include bold styling for the title of event messages that have not been clicked, a bullet in front of the title for events associated with objects the user has not viewed, or an ellipsis in front of the title for events associated with objects that at least one other user is currently editing. Other presentation options and/or visual elements are possible.

Event messages with any assigned visual elements can then be generated for each of the user-specific collaboration events. Specifically, in some embodiments widgets or screen devices that correspond to the assigned visual elements of the user-specific collaboration events are retrieved from a screen device repository (step 526), which widgets or screen devices are applied so as to form or decorate the event messages 136. The formation and/or decoration of such event messages might comprise human-readable text that describes the type of event, the objects (e.g., users, content, etc.) pertaining to the event, the time of the event, and/or other event characteristics or attributes of either the corresponding content object access event or the corresponding user interaction event. The event messages are then codified (e.g., into HTML or SVG, etc.) for presentation in an event panel of the subject user.

An example embodiment of a user interface that can be used to present such event messages to a subject user is disclosed in detail as follows.

Figure 6:
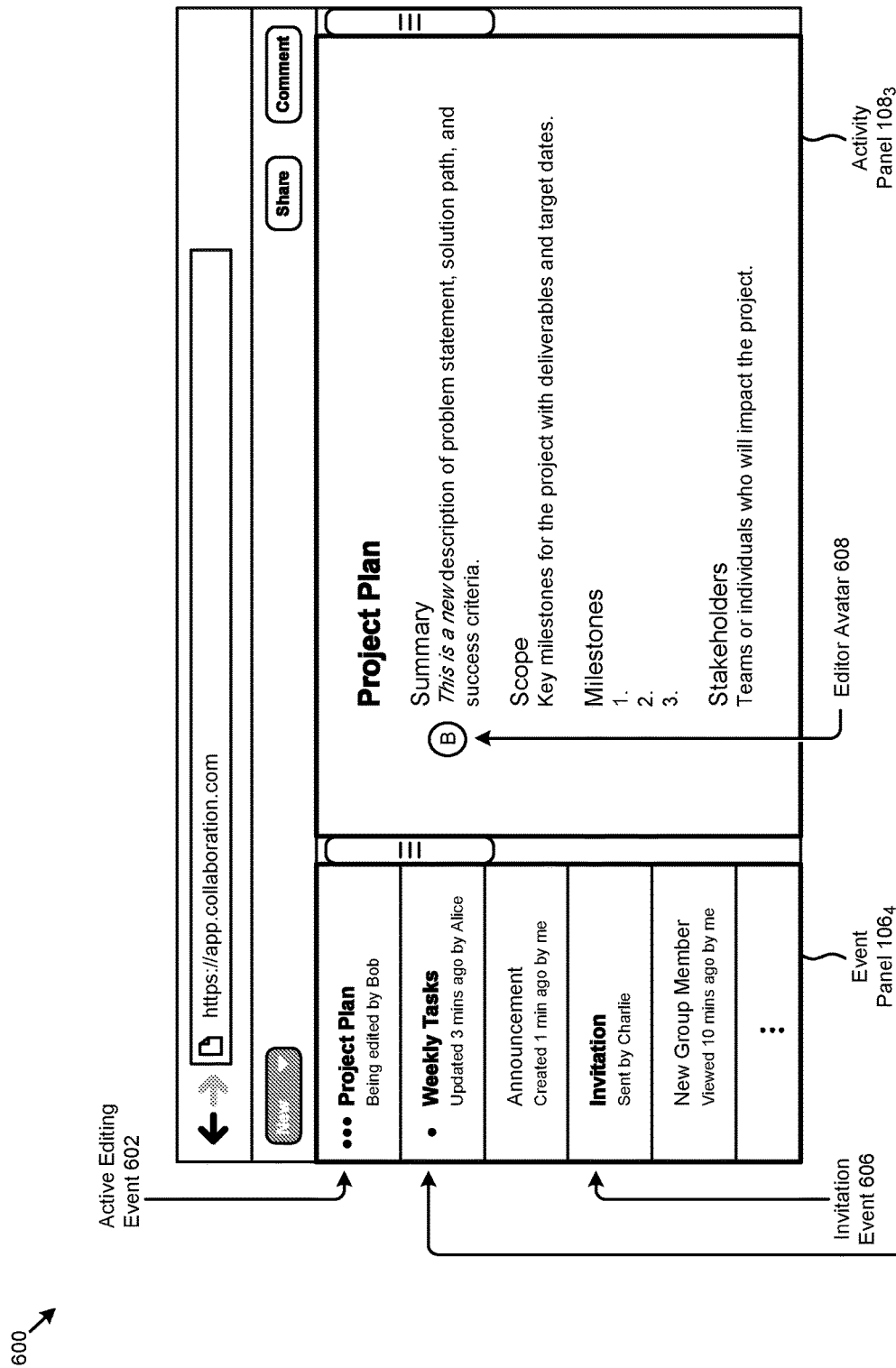
FIG. 6 illustrates a user interface for displaying event messages in systems that facilitate time-based presentation of collaboration events, according to an embodiment.

FIG. 6 illustrates a user interface 600 for displaying event messages in systems that facilitate time-based presentation of collaboration events. As an option, one or more variations of user interface 600 or any aspect thereof may be implemented in the context of the architecture and functionality of the embodiments described herein. The user interface 600 or any aspect thereof may be implemented in any environment.

FIG. 6 illustrates one aspect pertaining to establishing a framework to collect, sort and present various collaboration events that occur over multiple degrees of separation from the user. Specifically, the figure is presented to illustrate one embodiment of a user interface that comprises an event panel to display event messages to the user.

As shown in FIG. 6, the user interface 600 comprises an event panel 106$_4$ and an activity panel 108$_3$. As can be observed, the user interface 600 might be rendered in a browser. In the illustrated example of FIG. 6, the subject user of user interface 600 is interacting with a content object title "Project Plan" in the activity panel 108$_3$.

At the top of a display order in event panel 106$_4$ is an event message that corresponds to an active editing event 602. Specifically, this event message indicates that "Bob" is currently editing "Project Plan", which is the same document that is open in the activity panel 108$_3$. In certain embodiments, an editor avatar 608 associated with "Bob" might be displayed to indicate the portion of the content object that "Bob" is editing. A visual element (e.g., ellipsis) is also presented with the event message of the active editing event 602 to indicate the continual nature of the event. An event message pertaining to a content object update event 604 is also presented in the event panel 106$_4$. A bullet is presented with this event message to indicate the user has not viewed the underlying content object associated with the event. As another example, an event message corresponding to an invitation event 606 has a bolded title to indicate the user has not clicked on that particular message (e.g., to view and accept or reject the invitation).

Additional Embodiments of the Disclosure

Additional Practical Application Examples

Figure 7:
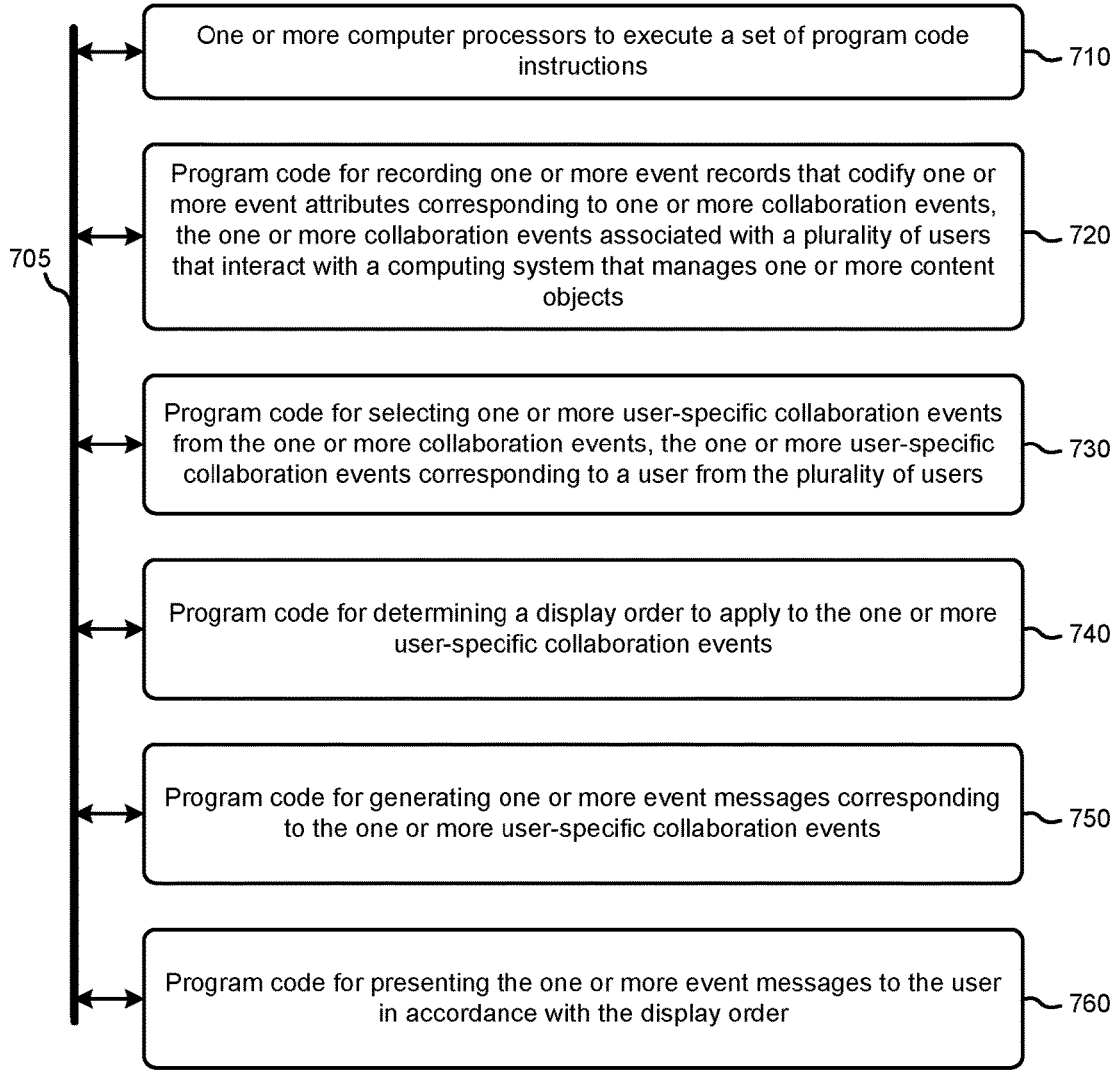
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address presenting time-sensitive events to users belonging to multiple collaboration groups. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising one or more computer processors to execute a set of program code instructions (module 710) and modules for accessing memory to hold program code instructions to perform: recording one or more event records that codify one or more event attributes corresponding to one or more collaboration events, the one or more collaboration events associated with a plurality of users that interact with a computing system that manages one or more content objects (module 720); selecting one or more user-specific collaboration events from the one or more collaboration events, the one or more user-specific collaboration events corresponding to a user from the plurality of users (module 730); determining a display order to apply to the one or more user-specific collaboration events (module 740); generating two or more event messages corresponding to the one or more user-specific collaboration events (module 750); and presenting the two or more event messages to the user in accordance with the display order (module 760).

Variations of the foregoing may include more or fewer of the shown modules. Certain variations may perform more or fewer (or different) steps and/or certain variations may use data elements in more or in fewer (or different) operations. More particularly, some embodiments further comprise steps for assigning one or more visual elements to at least one of the one or more event messages based at least in part on a portion of the one or more event attributes that corresponds to the one or more user-specific collaboration events. Some embodiment further comprise techniques for presenting the one or more visual elements when presenting the at least one of the one or more event messages. Variations include embodiments wherein the one or more event attributes describe one or more relationships between two or more objects, well as variations wherein the one or more user-specific collaboration events are selected based at least in part on the one or more relationships.

In example embodiments, the display order is determined based at least in part on one or more sorting rules, which sorting rules and/or the resulting display order is determined based at least in part on one or more timestamps associated with the one or more user-specific collaboration events. Depending on the timing of the display to a user, the collaboration events might comprise content object access events only, or might comprise user interaction events only, or might comprise combinations of content object access events together with user interaction events.

Still further, some embodiments include variations in the operations performed, and some embodiments include variations of aspects or storage of the data elements used in the operations. For example, in some embodiments, event records are logical constructions inside a computer server memory. The event records are represented in an event graph data structure using a relational database and one or more tables. The tables are organized as relational database relations that cover any number of degrees of separation between users. In example embodiments, an event graph data structure comprises logical representations of graph nodes that correspond to objects, and logical representations of graph edges that correspond to relationships between the objects.

System Architecture Overview

Additional System Architecture Examples

Figure 8A:
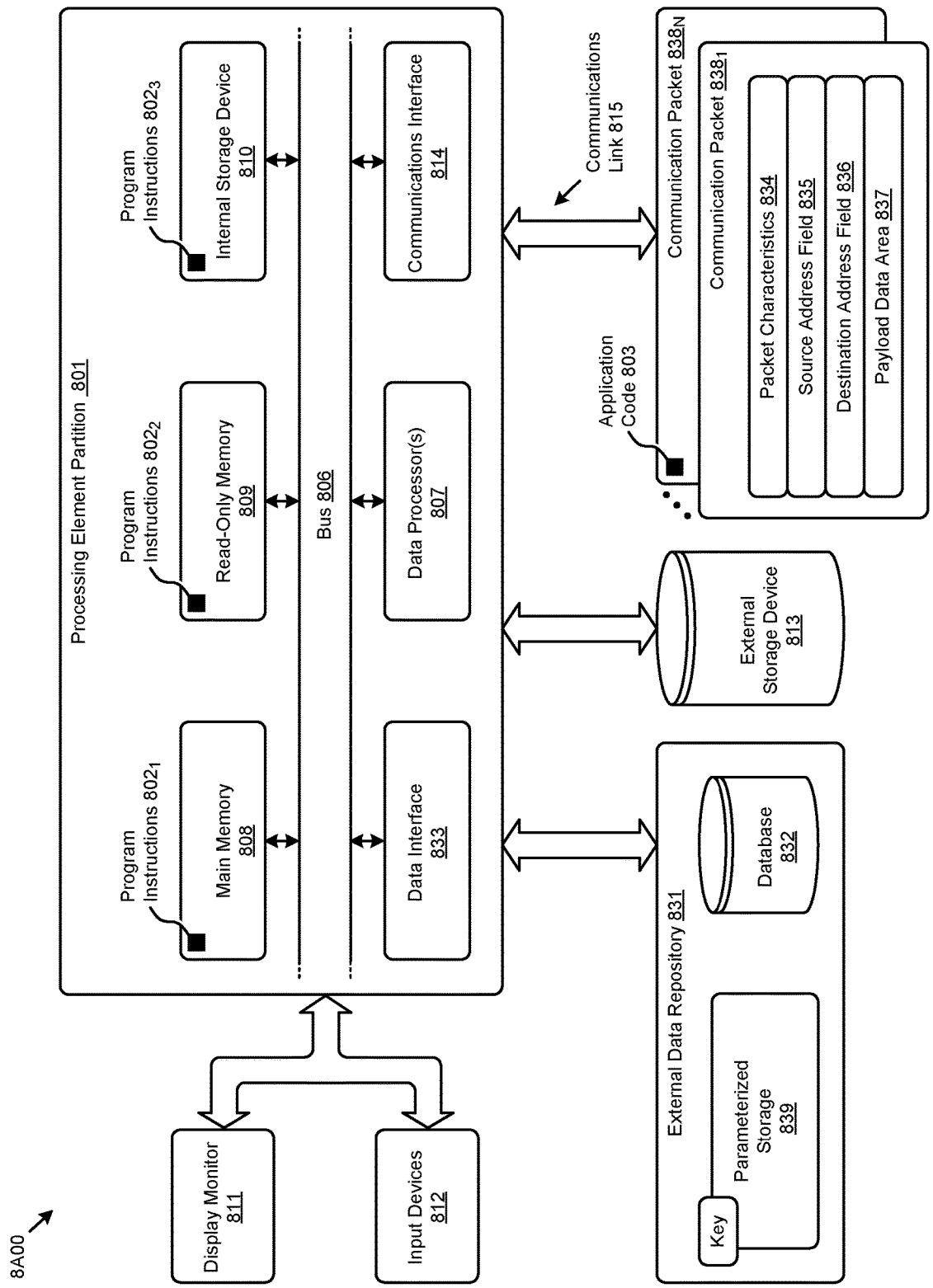
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $838_1$, communication packet 838N) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to time-based presentation of collaboration events. A module may include one or more state machines and/or combinational logic used to implement or facilitate the operational and/or performance characteristics pertaining to time-based presentation of collaboration events.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of time-based presentation of collaboration events). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to time-based presentation of collaboration events, and/or for improving the way data is manipulated when performing computerized operations pertaining to establishing a framework to collect, sort and present various collaboration events that occur over multiple degrees of separation from the user.

Figure 8B:
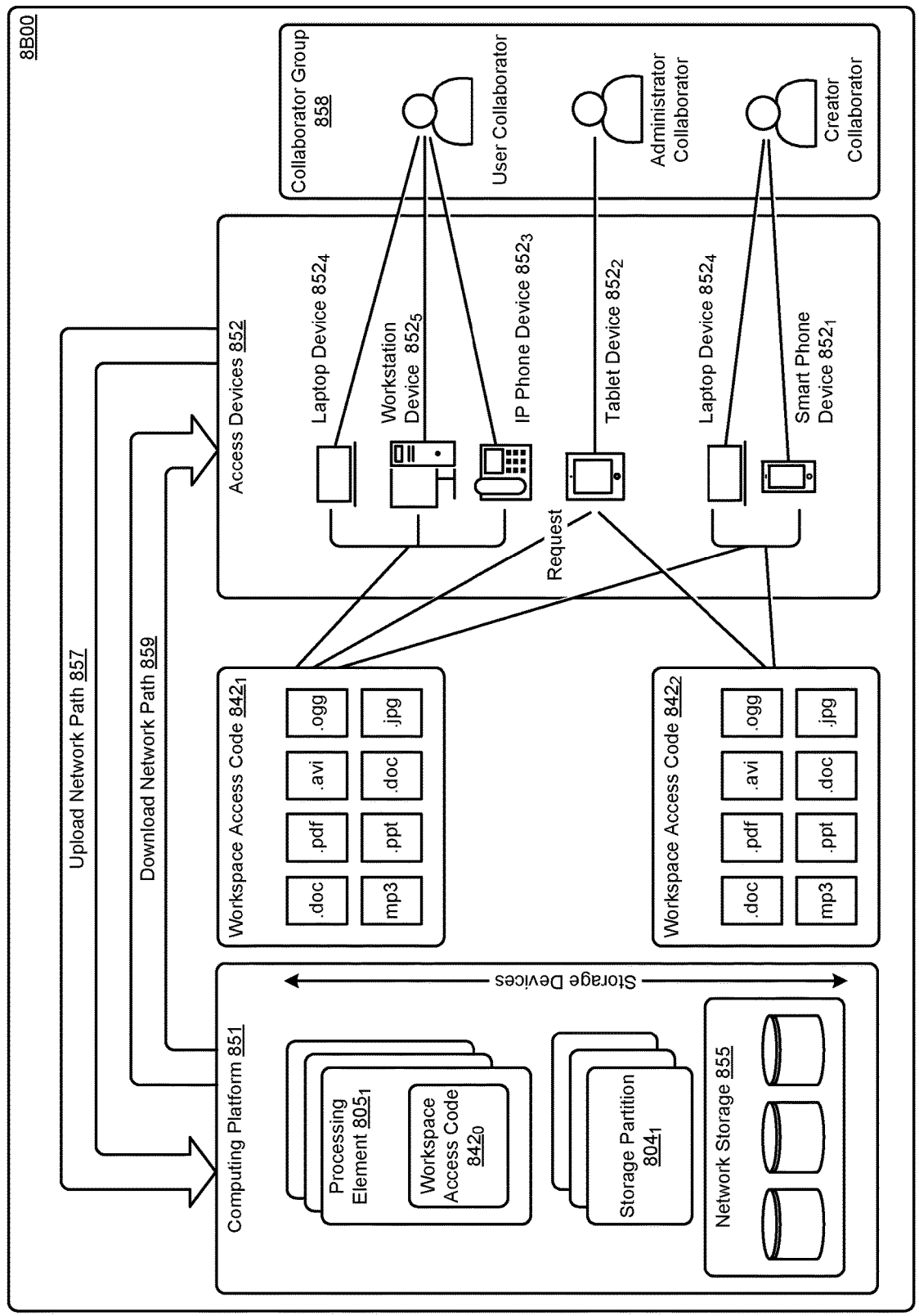

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code $842_2$). Workspace access code can be executed on any of access devices 852 (e.g., laptop device $852_4$, workstation device $852_5$, IP phone device $852_3$, tablet device $852_2$, smart phone device $852_1$, etc.). A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such as networked storage 855. Storage of workspaces and/or any constituent files or objects, and/or any other code or scripts or data can be stored in any one or more storage partitions (e.g., storage partition $804_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for presenting collaboration activity to a user, the method performed by at least one computer and comprising:

recording collaboration events using both a first structure and a second structure, wherein the second structure is generated as a separate graphical representation of the first structure, by:

collecting the collaboration events and storing the collaboration events in the first structure, wherein the first structure is a table comprised of event records having columns that codify one or more event attributes corresponding to the collaboration events, at least some of the collaboration events associated with at least two users or between a given user and a given object, and the columns in the table correspond to at least two or more of a user identifier, an object identifier, an event identifier, or an action;

representing, in the second structure, the collaboration events stored in the first structure, wherein the second structure is a graph representing relationships between the at least two users and between the given user and the given object using the separate graphical representation of the event records, wherein entries in the columns of the table are separately represented in the graph by nodes and edges, the nodes in the separate graphical representation represent the given user, the given object, or the at least two users, and the edges between the nodes in the separate graphical representation represent a first type of interaction between the given user and the given object or represent a second type of interaction between the at least two users;

selecting the collaboration events that are relevant for a first user based at least in part on the relationships in the separate graphical representation, wherein the collaboration events that are selected correspond to multiple degrees of separation from the first user such that a first degree of separation corresponds to a first collaboration event that directly comprise the first user acting upon a first content object, wherein the first content object accessed by a second user is also considered as the first degree of separation and an additional degree of separation corresponds to a second collaboration event that comprise the second user acting upon a second content object that is not acted upon by the first user, wherein the second user has a relationship with the first user based at least upon the first user and the second user both acting upon the first content object as a first level relationship, and a selection process for the collaboration events makes a determination of a number of degrees of separation;

generating event messages corresponding to the collaboration events that are selected; and presenting the event messages to the user on a display screen of a user device.

2. The method of claim 1, further comprising:

assigning a visual element to at least one of the event messages based at least in part on a timestamp of a respective collaboration event of the collaboration events.

3. The method of claim 2, wherein the visual element is determined based at least in part on the timestamp.

4. The method of claim 3, wherein the visual element is determined based at least in part on a combination of the timestamp and an object action type of the respective collaboration event.

5. The method of claim 2, wherein the visual element is an animated GIF.

6. The method of claim 1, wherein the event messages are displayed in an order based at least in part on one or more sorting rules.

7. The method of claim 6, wherein at least one of the one or more sorting rules is based at least in part on one or more timestamps associated with two or more collaboration events.

8. The method of claim 1, wherein the event messages are presented to the user in an event panel of a user interface.

9. The method of claim 1, wherein the separate graphical representation of the event records comprises a first set of nodes and edges that correlate to the first level relationship between the first user and a first set of objects and the separate graphical representation of the event records comprises a second set of nodes and edges that correlate to a second level relationship between the first user and a second set of objects.

10. The method of claim 9, wherein the first level relationship is characterized by a respective event record comprising a user ID (identifier) for the first user and the second level relationship is characterized by a second respective event record comprising a second user ID for the second user.

11. The method of claim 9, wherein the separate graphical representation of the event records for the first user is constructed by inserting first level events into the separate graphical representation that correlate to the first level relationship for the first user, wherein the first level events correspond to the first user as an event object, and subsequently inserting second level events into the separate graphical representation that correlate to the second level relationship for the first user.

12. A computer readable medium, embodied in a non-transitory computer readable medium, the non-transitory computer readable medium having stored thereon a sequence of instructions which, when stored in memory and executed by one or more processors, causes the one or more processors to perform a set of acts for presenting collaboration activity to a user, the acts comprising:

recording collaboration events using both a first structure and a second structure, wherein the second structure is generated as a separate graphical representation of the first structure, by:

collecting the collaboration events and storing the collaboration events in the first structure, wherein the first structure is a table comprised of event records having columns that codify one or more event attributes corresponding to the collaboration events, at least some of the collaboration events associated with at least two users or between a given user and a given object, and the columns in the table correspond to at least two or more of a user identifier, an object identifier, an event identifier, or an action;

representing, in the second structure, the collaboration events stored in the first structure, wherein the second structure is a graph representing relationships between the at least two users and between the given user and the given object using the separate graphical representation of the event records, wherein entries in the columns of the table are separately represented in the graph by nodes and edges, the nodes in the separate graphical representation represent the given user, the given object, or the at least two users, and the edges between the nodes in the separate graphical representation represent a first type of interaction between the given user and the given object or represent a second type of interaction between the at least two users;

selecting the collaboration events that are relevant for a first user based at least in part on the relationships in the separate graphical representation, wherein the collaboration events that are selected correspond to multiple degrees of separation from the first user such that a first degree of separation corresponds to a first collaboration event that directly comprise the first user acting upon a first content object, wherein the first content object accessed by a second user is also considered as the first degree of separation and an additional degree of separation corresponds to a second collaboration event that comprise the second user acting upon a second content object that is not acted upon by the first user, wherein the second user has a relationship with the first user based at least upon the first user and the second user both acting upon the first content object as a first level relationship, and a selection process for the collaboration events makes a determination of a number of degrees of separation;

generating event messages corresponding to the collaboration events that are selected; and presenting the event messages to the user on a display screen of a user device.

13. The computer readable medium of claim 12, further comprising the instructions which, when stored in the memory and executed by the one or more processors causes the one or more processors to perform the acts of:

assigning a visual element to at least one of the event messages based at least in part on a timestamp of a respective collaboration event of the collaboration events.

14. The computer readable medium of claim 13, wherein the visual element is determined based at least in part on the timestamp.

15. The computer readable medium of claim 14, wherein the visual element is determined based at least in part on a combination of the timestamp and an object action type of the respective collaboration event.

16. The computer readable medium of claim 12, wherein the event messages are displayed in an order based at least in part on one or more sorting rules.

17. The computer readable medium of claim 16, wherein at least one of the one or more sorting rules is based at least in part on one or more timestamps associated with two or more collaboration events.

18. The computer readable medium of claim 12, wherein the event messages are presented to the user in an event panel of a user interface.

19. A system for presenting collaboration activity to a user, the system performed by at least one computer and comprising:

a non-transitory storage medium having stored thereon a sequence of instructions; and one or more processors that execute the sequence of instructions to cause the one or more processors to perform a set of acts, the set of acts comprising:

recording collaboration events using both a first structure and a second structure, wherein the second structure is generated as a separate graphical representation of the first structure, by:

collecting the collaboration events and storing the collaboration events in the first structure, wherein the first structure is a table comprised of event records having columns that codify one or more event attributes corresponding to the collaboration events, at least some of the collaboration events associated with at least two users or between a given user and a given object, and the columns in the table correspond to at least two or more of a user identifier, an object identifier, an event identifier, or an action;

representing, in the second structure, the collaboration events stored in the first, wherein the second structure is a graph representing relationships between the at least two users and between the given user and the given object using the separate graphical representation of the event records, wherein entries in the columns of the table are separately represented in the graph by nodes and edges, the nodes in the separate graphical representation represent the given user, the given object, or the at least two users, and the edges between the nodes in the separate graphical representation represent a first type of interaction between the given user and the given object or represent a second type of interaction between the at least two users;

selecting the collaboration events that are relevant for a first user based at least in part on the relationships in the separate graphical representation, wherein the collaboration events that are selected correspond to multiple degrees of separation from the first user such that a first degree of separation corresponds to a first collaboration event that directly comprise the first user acting upon a first content object, wherein the first content object accessed by a second user is also considered as the first degree of separation and an additional degree of separation corresponds to a second collaboration event that comprise the second user acting upon a second content object that is not acted upon by the first user, wherein the second user has a relationship with the first user based at least upon the first user and the second user both acting upon the first content object as a first level relationship, and a selection process for the collaboration events makes a determination of a number of degrees of separation;

generating event messages corresponding to the collaboration events that are selected; and presenting the event messages to the user on a display screen of a user device.

20. The system of claim 19, wherein the event messages are displayed in an order based at least in part on one or more sorting rules.

21. The system of claim 19, wherein a visual element is assigned to at least one of the event messages based at least in part on a timestamp of a respective collaboration event of the collaboration events.

* * * * *